Patented May 13, 1947

2,420,419

UNITED STATES PATENT OFFICE 2,420,419

PURIFICATION OF FLUIDS WITH CATION ACTIVE RESINS

James R. Dudley, Cos Cob, Conn., assignor to American Cyanamid Company, New York, N. Y., a corporation of Maine No Drawing. Application March 30, 1944, Serial No. 528,769

6 Claims. (Cl. 210—24)

This invention relates to the removal of cations from fluid media, to the exchange of cations in fluid media, and to the purification of fluid media.

An object of this invention is to provide a process for removing cations from fluid media.

Another object of my invention is to purify fluid media, and more particularly aqueous media, containing undesired cations.

These and other objects are attained by contacting the fluid to be treated with a material obtained by reacting furfural with a mineral acid halide and resinifying to a water-insoluble form. The following examples in which the proportions are in parts by weight are given by way of illustration and not in limitation. The furfural used is of 95% purity.

Example 1

A cylinder or other vessel is filled with a granular cation active material prepared in accordance with one or more of the examples set forth below. Through this bed of resin a dilute acid solution, e. g. 0.2–10% sulfuric acid, is passed and the resin is activated after which it is washed with water to remove residual acid. This bed of resin is now in the so-called hydrogen activated state and is suitable for removing cations from fluid media such as water.

Water containing about 50 P. P. M. of total solids including about 37 P. P. M. of non-volatile solids is passed through the bed of cation active resin. The pH of the water before treatment is about 6.6 and after treatment, about 3. Most of the cations are removed. The acidity of the effluent may be removed by passing it through an anion active resin, and the water may be still further purified by passing it through another bed of cation active material after which it may be aerated to remove carbon dioxide or further treated with additional beds of anion and cation active materials.

If the water contains only bases, the effluent will be substantially neutral and free of cations until the capacity of the bed of resin is approached. If, however, as in the above example, the water contains salt, the effluent will be acidic and for most purposes it is desirable to pass the effluent through a bed of anion active resin to remove the acid. In most purification processes, particularly if the salt content of the fluid to be treated is high, it will be necessary or desirable to employ a plurality of cation active beds with an anion active bed between each of the cation active beds, substantially as described.

Example 2

About 10 liters of an aqueous solution containing 50% of crude cane sugar which is dark brown in color, quite turbid and has a pH of about 6.5 is heated to about 65° C. The solution may be subjected to a preliminary filtration if desired and is then passed through a bed of a cation active material prepared in accordance with my invention, for example, the resin of Example 9. The pH of the effluent from the cation active material which is a very pale yellow is about 3 thereby indicating that cations have been removed with consequent release of acid forming radicals such as chloride, sulfate, sulfite, etc. The effluent may be passed through an anion active resin to remove the acid and other anions which may be present and this may be followed by further treatments with cation and anion active resins, or it may be followed by treatment with bone black or any of the other purification methods employed in sugar refining. Finally the sugar may be crystallized from the purified sugar solution to produce a crystalline sugar of extremely high purity and brilliance characteristic of high grade sugar. Furthermore, if molasses be produced as a by-product from this sugar, it is a high quality product having a light color and a very low content of salts as impurities.

Other aqueous solutions containing cations may be purified in the same general manner as described in the preceding examples. Furthermore, other fluid media containing cations may be purified in the same general manner. The following examples illustrate the cation active materials which are suitable for use in my purification process, as well as processes for preparing such materials.

Example 3

Sulfuryl chloride _____ 540 parts (4.0 mols)
Glacial acetic acid _____ 840
Furfural _____ 808 parts (8.0 mols)

The sulfuryl chloride is dissolved in the acetic acid, and the solution cooled in an ice bath. The furfural is then added slowly with stirring so that the temperature of the solution does not exceed 20° C. When the addition is complete the solution is black and upon standing overnight, a very soft black gel is formed. After standing for an additional day the gel becomes firm and hard.

The gel is reduced to particles of small size which are covered with water and allowed to stand overnight. The water is then drained off and the resin dried for 4 hours at 100° C. and evaluated. The final product exhibits a capacity for the absorption or exchange of cations from water equivalent to about 8,000 grains of calcium carbonate per cubic foot of resin and the density of the material is about 12.2 pounds per cubic foot.

Example 4

Example 3 is repeated but instead of soaking the small-sized particles of the gel, they are suspended in water and the mixture boiled for 4 hours. The water is then drained off and the resin dried for 4 hours at 100° C. The final product exhibits a capacity for the absorption or exchange of cations from water equivalent to about 7,100 grains of calcium carbonate per cubic foot of resin and the density of the material is about 10.5 pounds per cubic foot.

Example 5

Example 3 is repeated but instead of soaking the gel particles in water overnight, dry steam is passed through the resin for 4 hours. After this treatment the resin is dried for 4 hours at 100° C. and the final product has a capacity for the absorption of cations from water equivalent to about 9,600 grains of calcium carbonate per cubic foot of resin. The density of the material is about 13.2 pounds per cubic foot.

Example 6

Sulfuryl chloride_____ 540 parts (4.0 mols)
Glacial acetic acid_____ 840 parts
Furfural_____ 1010 parts (10.0 mols)

As in Example 3 the sulfuryl chloride is dissolved in the acetic acid, this solution is cooled in an ice bath, and the furfural is then added slowly with stirring so that the temperature of the solution does not exceed 20° C. The solution is black when the addition is complete and a hard black brittle gel is formed on standing overnight.

The gel is broken into small particles which are covered with water and allowed to stand overnight. The water is drained off and the resin dried for 4 hours at 100° C. The final product has a capacity for the absorption of cations from water equivalent to about 9,900 grains of calcium carbonate per cubic foot of resin and the density of the material is about 17.3 pounds per cubic foot.

Example 7

The procedure of Example 6 is followed except that instead of soaking the gel particles overnight they are suspended in water and the mixture is boiled for 4 hours. The water is then drained off and the resin dried for 4 hours at 100° C. The final product exhibits a capacity for the absorption of cations from water equivalent to about 15,600 grains of calcium carbonate per cubic foot of resin and the density of the material is about 15.6 pounds per cubic foot.

After evaluation the resin is redried for 17 hours at 145° C. to give a product having a capacity equivalent to about 12,900 grains of calcium carbonate per cubic foot of resin and a density of 7.7 pounds per cubic foot.

Example 8

The procedure of Example 6 is followed except that instead of soaking the gel particles overnight, dry steam is passed through the resin for 4 hours as in Example 5. The resin is then dried for 4 hours at 100° C. and the final product found to have a capacity for the absorption or exchange of cations from water equivalent to about 14,100 grains of calcium carbonate per cubic foot of resin. The resin has a density of 16.0 pounds per cubic foot.

Example 9

Sulfuryl chloride_____ 540 parts (4.0 mols)
Glacial acetic acid_____ 840 parts
Furfural_____ 1212 parts (12.0 mols)

The sulfuryl chloride is dissolved in the acetic acid, the resulting solution cooled in an ice bath, and the furfural is then added slowly with stirring so that the temperature of the solution does not exceed 20° C. Upon standing overnight a gel is formed which is harder and more brittle than that of Example 6.

The gel is broken into small-sized particles which are cured in an oven for 4 hours at 50° C. and then for an additional 4 hours at 100° C. The cured resin particles are then covered with water and allowed to stand overnight. The water is drained off and the resin dried for 4 hours at 100° C.

The final cured and hydrolyzed product has a capacity for the absorption or exchange of cations from water equivalent to about 18,300 grains of calcium carbonate per cubic foot of resin and a density of 18.2 pounds per cubic foot.

Example 10

The procedure of Example 9 is repeated except that instead of soaking the cured resin particles overnight they are suspended in water and boiled for 4 hours. Following this the water is drained off and the resin is dried for 4 hours at 100° C. The final product exhibits a capacity for the absorption or exchange of cations from water equivalent to about 18,100 grains of calcium carbonate per cubic foot of resin and has a density of 18.4 pounds per cubic foot.

Example 11

A hard brittle gel is prepared as described in Example 9. Instead of curing small-sized particles of this gel by heating in an oven for a period of time, they are covered with water and allowed to stand overnight. The water is then drained off and the resin particles dried for 4 hours at 100° C.

The final product has a capacity for the absorption or exchange of cations from water equivalent to about 11,700 grains of calcium carbonate per cubic foot of resin and a density of 22.2 pounds per cubic foot.

Example 12

Example 9 is repeated except that the curing step is omitted. The hard brittle gel particles are suspended in water and boiled for 4 hours. After draining off the water, the resin is dried for 4 hours at 100° C. and evaluated. The final product has a capacity for the absorption of cations from water equivalent to about 10,800 grains of calcium carbonate per cubic foot and a density of 23.2 pounds per cubic foot.

Example 13

Example 9 is repeated except that the gel is not cured but particles thereof instead are treated by passing dry steam therethrough for 4 hours as described in Example 5, and the resin is then dried for 4 hours at 100° C.

The final product has a capacity for the exchange of cations in water equivalent to about 12,800 grains of calcium carbonate per cubic foot and a density of the material is about 21.7 pounds per cubic foot.

Example 14

| | |
|---|---|
| Phosphorus oxychloride | 77 parts (0.5 mol) |
| Glacial acetic acid | 105 parts |
| Furfural | 101 parts (1.0 mols) |

The phosphorus oxychloride is dissolved in the acetic acid and the solution cooled to about 3° C. The furfural, cooled to about 5° C. is then added. The solution is black and after standing overnight a soft brittle rubbery black gel is formed. Upon warming up, an exothermic reaction occurs in which acetic acid and hydrochloric acid fumes are distilled from the material. Upon cooling a very hard brittle gel is obtained.

Small-sized particles of the gel are covered with water and allowed to stand for 4 hours. Steam is then bubbled into the mixture for 4 hours, the water is drained off, and the resin is dried for 4 hours at 100° C. The final product has a capacity for the absorption of cations from water equivalent to about 16,100 grains of calcium carbonate per cubic foot of resin and the density of the material is about 17.5 pounds per cubic foot.

Example 15

| | |
|---|---|
| Phosphorus oxychloride | 77 parts (0.5 mol) |
| Glacial acetic acid | 105 parts |
| Furfural | 152 parts (1.5 mols) |

The procedure of Example 14 is followed throughout. The brittle black gel, somewhat firmer than that formed in Example 14, has a capacity for the absorption of cations from water equivalent to about 17,300 grains of calcium carbonate per cubic foot of resin. The density of the material is about 19.6 pounds per cubic foot.

The mineral acid halides are preferably resinified with furfural alone although a minor portion of the furfural may be replaced by other aldehydes, particularly formaldehyde, a polymer of formaldehyde or a substance yielding formaldehyde. Other aldehydes which may be used include acetaldehyde, butyraldehyde, heptaldehyde, crotonaldehyde, acrolein, benzaldehyde, etc.

The resins of the present invention may be cured by heating at a temperature ranging from room temperature to about 150° C. for from several hours to a day.

My resinous materials may be used alone or in admixture with other cation-active materials. Furthermore, my resins may be applied before gelation to a suitable carrier such as diatomaceous earth, clays, charcoal, etc. In this way, the active resin is spread on the surface of a relatively inert material and this enables one to employ a smaller quantity of resin than otherwise to obtain the same active area.

The granular resinous condensation products of furfural and mineral acid halides, and particularly those having a particle size less than 8 mesh, are useful in the removal of cations from fluid media, especially aqueous solutions. The resins may be used in the hydrogen-activated form to remove cations from solutions of bases. My resinous cation-active materials may also be employed as exchange materials in accordance with the principles applied to the use of the natural and synthetic zeolites. Thus, the resin may be activated with a sodium salt such as sodium chloride and upon contact with a solution containing calcium, magnesium or other cations, an exchange of the latter ions for the sodium ions takes place.

The activating solutions or regenerating solutions are dilute acid solutions or dilute salt solutions, e. g., about 0.2%–10% of sulfuric acid, hydrochloric acid, sodium chloride, potassium chloride, etc.

To be sufficiently insoluble for practical use in the art of water purification, a resin should have a sufficiently low solubility that it will not be dissolved away rapidly by the solution to be treated. Thus, water should not dissolve more than about 1 part of resin in 1,000 parts of water when passed through a bed of resin (after the first cycle comprising an activation, exhaustion and reactivation of the resin).

My process of purifying fluid media is applicable not only to water purification and to the purification of sugar solutions as illustrated in Examples 1 and 2, but also to the removal of heavy metal cations from foods, beverages and pharmaceutical products, to the removal of basic dyes from fluid media, to the removal of valuable cations from dilute solutions, e. g., gold from sea water, chromium from chrome tanning liquors, silver from photographic baths, etc. Another important application of my purification process is in the absorption or adsorption of gases such as ammonia, amines as e. g., triethylamine, methylamine, etc., from fluid media either dissolved in a liquid or from vapors. Such vapors may consist almost entirely of the gas to be absorbed or they may contain a relatively inert gas such as air, nitrogen, carbon dioxide, etc.

I claim:

1. A process of removing cations from fluid media which comprises treating a fluid containing cations with a granular water-insoluble composition of matter having a particle size of less than about 8 mesh and comprising the hydrolyzed product of reaction of a mixture including furfural and a mineral acid halide selected from the group consisting of sulfuryl chloride and phosphorus oxychloride, and separating the fluid from the water-insoluble composition of matter.

2. A process of removing cations from fluid media which comprises treating a fluid containing cations with a granular water-insoluble composition of matter having a particle size of less than about 8 mesh and comprising the hydrolyzed product of reaction of a mixture including furfural and sulfuryl chloride, and separating the fluid from the water-insoluble composition of matter.

3. A process of removing cations from fluid media which comprises treating a fluid containing cations with a granular water-insoluble composition of matter having a particle size of less than about 8 mesh and comprising the hydrolyzed product of reaction of a mixture including furfural and phosphorus oxychloride, and separating the fluid from the water-insoluble composition of matter.

4. A process which comprises passing an aqueous fluid containing cations through a bed of a granular material, said material having a particle size of less than about 8 mesh and comprising the hydrolyzed reaction product of a mixture including furfural and a mineral acid halide of the group consisting of sulfuryl chloride and phosphorus oxychloride.

5. A process which comprises passing an aqueous fluid containing cations through a bed of a granular material, said material having a particle size of less than about 8 mesh and comprising the hydrolyzed reaction product of a mixture including furfural and sulfuryl chloride.

6. A process which comprises passing an aqueous fluid containing cations through a bed of a granular material, said material having a particle size of less than about 8 mesh and comprising the hydrolyzed reaction product of a mixture including furfural and phosphorus oxychloride.

JAMES R. DUDLEY.

REFERENCES CITED

The following references are of record in the file of this patent:

UNITED STATES PATENTS

| Number | Name | Date |
|---|---|---|
| 1,682,934 | Richardson | Sept. 4, 1928 |
| 1,940,388 | Woodstock | Dec. 19, 1933 |
| 2,251,234 | Swain | July 29, 1941 |
| 2,285,750 | Swain | June 9, 1942 |
| 2,355,402 | Sussman | Aug. 8, 1944 |